United States Patent

Hergenrother et al.

[11] 4,182,837
[45] Jan. 8, 1980

[54] POLYPHOSPHAZENE COPOLYMERS CONTAINING SULFONE SUBSTITUENTS

[75] Inventors: William L. Hergenrother, Akron; Adel F. Halasa, Bath, both of Ohio

[73] Assignee: The Firestone Tire & Rubber Company, Akron, Ohio

[21] Appl. No.: 953,281

[22] Filed: Oct. 20, 1978

[51] Int. Cl.$^2$ .................... C08L 81/06; C08L 79/00
[52] U.S. Cl. ........................ 528/168; 528/378; 528/380; 528/391; 528/399
[58] Field of Search ............ 528/168, 378, 380, 391, 528/399

[56] References Cited

U.S. PATENT DOCUMENTS

| | | | |
|---|---|---|---|
| 3,164,556 | 1/1965 | Apley et al. | 528/391 |
| 3,591,530 | 7/1971 | Sollberger et al. | 528/391 |

*Primary Examiner*—Wilbert J. Briggs, Sr.

[57] ABSTRACT

Polyphosphazene copolymers are prepared which contain units represented by the formulas:

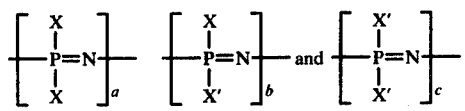

wherein X is a sulfone radical selected from the group consisting of $-CR_1R_2-SO_2-R$ and

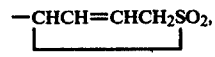

$-CHCH=CHCH_2SO_2$, in which R is alkyl containing from 1 to 12 carbon atoms, cycloalkyl containing from 3 to 12 carbon atoms or aryl and $R_1$ and $R_2$ are individually selected from the group consisting of hydrogen, alkyl radicals containing from 1 to 11 carbon atoms, cycloalkyl radicals containing from 3 to 11 carbon atoms and aryl radicals; wherein X' is an organic radical selected from the group consisting of substituted or unsubstituted alkoxy, aryloxy, amino and mercapto groups and wherein $20 \leq (a+b+c) \leq 50,000$ per polymer.

The copolymers of the invention can be utilized to form films and may also be utilized in applications for moldings, coatings and the like.

12 Claims, No Drawings

POLYPHOSPHAZENE COPOLYMERS CONTAINING SULFONE SUBSTITUENTS

BACKGROUND OF THE INVENTION

This invention relates to polyphosphazene copolymers containing repeating

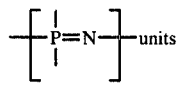

in the polymer chain in which substituents are attached to the phosphorus atom. More particularly, the invention relates to polyphosphazene copolymers containing sulfone substituents and substituted or unsubstituted alkoxy, aryloxy, amino, or mercapto groups.

Polyphosphazene polymers containing repeating

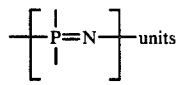

in which various substituted and unsubstituted alkoxy, aryloxy, amino and mercapto groups are attached to the phosphorus atom and their method of preparation are described in the prior art as illustrated in the publication "Nitrogen-Phosphorus Compounds", by H. R. Allcock and "Poly(Organophosphazenes)", Chemtech, Sept. 19, 1975 by H. R. Allcock and in such U.S. Pat. Nos. as 3,515,688; 3,702,833; 3,856,712; 3,974,242 and 4,042,561, the disclosures of which are herein incorporated by reference.

SUMMARY OF THE INVENTION

In accordance with this invention, polyphosphazene copolymers are prepared which contain sulfone substituents.

The polyphosphazene copolymers of this invention contain units represented by the formulas:

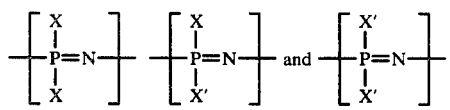

wherein X is a sulfone radical selected from the group consisting of $-CR_1R_2-SO_2-R$ and

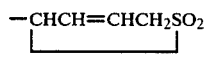

in which R is alkyl containing from 1 to 12 carbon atoms, cycloalkyl containing from 3 to 12 carbon atoms or aryl and $R_1$ and $R_2$ are individually selected from the group consisting of hydrogen, alkyl radicals containing from 1 to 11 carbon atoms, cycloalkyl radicals containing from 3 to 11 carbon atoms and aryl radicals and wherein X' is an organic radical selected from the group consisting of substituted or unsubstituted alkoxy, aryloxy, amino and mercapto groups.

In the copolymer units represented by the above formulas, all X substituent groups may be the same or they may be mixed and all X' substituent groups may be the same or mixed. In the mixtures, the X substituent groups may be mixtures of different sulfone substituent groups and the X' substituent groups may be mixtures of substituted or unsubstituted alkoxy, aryloxy, amino and mercaptan groups or mixtures of different groups within each class.

The specific proportion of X to X' substituent groups incorporated in the polymers of the invention may vary considerably depending upon chemical and physical properties desired in the polymer and the particular end use for which the polymer is intended. Thus, for applications such as moldings, coating, foams and the like, the polymer should contain at least 5 mole percent by weight of the sulfone substituent.

The copolymers are preferably prepared by reacting a poly(dichlorophosphazene) having the formula $-(NPCl_2)_n-$, in which n is from 20 to 50,000 with a mixture of a sulfone compound and an aliphatic alcohol, aromatic alcohol, amino compound or mercaptan compound in the presence of a tertiary amine.

Alternatively, the polymers can be prepared utilizing the prior art sodium processes described in the aforementioned U.S. Pat. Nos. 3,515,688; 3,702,833; 3,856,712; and the Allcock articles, the disclosures of which are hereby incorporated herein by reference.

DETAILED DESCRIPTION OF THE INVENTION

The term "copolymer" as employed hereinafter throughout the specification and claims is utilized in its broadest sense and includes polyphosphazene copolymers, terpolymers, tetrapolymers and the like.

I. THE POLY(DICHLOROPHOSPHAZENE) POLYMER

Poly(dichlorophosphazene) polymers which are employed as starting materials in preparing the copolymers of this invention are well known in the art as illustrated in U.S. Pat. Nos. 3,370,020; 4,005,171; and 4,055,520, the disclosures of which are incorporated herein by reference.

These polymers have the general formula $-(NPCl_2)_n-$, in which n may range from 20 to 50,000 or more. As described in the aforementioned references, the polymers are in general prepared by the thermal polymerization of cyclic oligomers having the formula $-(NPCl_2)_n-$, in which n is an integer of from 3 to 7, with the cyclic trimer and tetramer often comprising up to 90% of the oligomers.

The specific conditions of temperature, pressure and time employed in the thermal polymerization of the cyclic oligomers can vary considerably depending on whether or not the polymerization is catalyzed. Thus, temperatures may range from about 130° C. to about 300° C., pressures may range from a vacuum of less than about $10^{-1}$ Torr to superatmospheric and times may range from 30 minutes to about 48 hours.

A preferred process for preparing the poly(dichlorophosphazene) polymers used in the process of this invention is described in the aforementioned incorporated U.S. Pat. No. 4,005,171.

II. THE SULFONE SUBSTITUENTS

As indicated above, the sulfone substituent groups of the copolymers of the invention are sulfone radicals represented by the formulas $-CR_1R_2-SO_2-R$ and

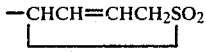

in which R, $R_1$ and $R_2$ are as previously defined. Such sulfone radicals may be derived from sulfone compounds represented by the formulas $HCR_1R_2-SO_2-R$ and

wherein R, $R_1$ and $R_2$ are as defined above.

The presence of the $-SO_2-$ group in such sulfone compounds renders any hydrogen atoms bonded to a saturated carbon atom which is adjacent to the sulfone group acidic and, therefore, capable of reaction with the chlorine atoms of the poly(dichlorophosphazene) when reacted therewith in the presence of an acidic or basic catalyst. The reaction scheme utilizing dimethyl sulfone for illustrative purposes is believed to proceed as follows:

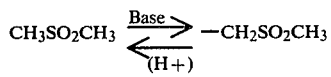

Illustrative examples of sulfone compounds from which the sulfone substituent groups of the copolymers may be derived include 2,5-dihydrothiophene 1,1-dioxide (butadiene sulfone, which may be represented by the formulas

or structurally as

dialkyl sulfones such as dimethyl sulfone, diethyl sulfone, di-n-butyl sulfone, di-n-propyl sulfone, dihexyl sulfone, dioctyl sulfone and the like; cycloalkyl sulfones such as cyclopropyl methyl sulfone, cyclohexyl methyl sulfone, cyclopentyl methyl sulfone and the like and aryl sulfones such as dibenzyl sulfone, phenyl methyl sulfone and the like. Preferred sulfone compounds for use in preparing the copolymers of the invention are dialkyl sulfones, especially dimethyl sulfone and butadiene sulfone.

The presence of the sulfone substituent group in the copolymers of the invention should provide for improved thermal stability and solvent resistance in the polymeric product.

III. THE ALKOXY, ARYLOXY, AMINO AND MERCAPTO SUBSTITUENTS

As indicated heretofore, the polyphosphazene copolymers of the invention in addition to the sulfone substituent group may contain as the X' substituent group substituted or unsubstituted alkoxy, aryloxy, amino or mercapto groups.

The alkoxy groups (substituted or unsubstituted) may be derived from aliphatic alcohols having from 1 to 20 carbon atoms such as methanol, ethanol, propanol, iospropanol, n-butanol, sec-butanol, hexane, dodecanol and the like; fluoroalcohols, especially those represented by the formula $Z(CH_2)_nCH_2OH$ in which Z is hydrogen or fluorine and n is an integer from 1 to 10 as illustrated by trifluoroethanol, 2,2,3,3,3-pentafluoropropanol, 2,2,3,3,4,4,4-heptafluorobutanol; 2,2,3,3-tetrafluoropropanol; 2,2,3,3,4,4,5,5-octafluoropentanol; 2,2,3,3,4,4,5,5,6,6,7,7-dodecafluoroheptanol and the like. In instances where it is desired to incorporate mixed X' substituent groups in the copolymers, mixtures of the foregoing alcohols may be employed.

The aryloxy groups (substituted or unsubstituted) may be derived from aromatic alcohols including among others phenol; alkylphenols such as cresols, xylenols, p-, o-, and m- ethyl and propyl phenols and the like; halogen-substituted phenols such as p-, o-, and m-chloro and bromo phenols and di- or tri-halogen substituted phenols and the like; and alkoxy-substituted phenols such as 4-methoxyphenol, 4-(n-butoxy) phenol and the like. Mixtures of the foregoing aromatic alcohols may also be employed.

The amino groups may be derived from any of the amino compounds heretofore employed in the polyphosphazene polymer art. Thus, the amino groups may be derived from aliphatic primary and secondary amines such as methylamine, ethylamine, dimethylamine, ethylmethylamine and the like and aromatic amines such as those described in U.S. Pat. No. 4,042,561, incorporated herein by reference, as illustrated by aniline, halogen-substituted anilines, alkyl-substituted anilines, alkoxy-anilines, alkoxy-substituted anilines and the like.

The mercapto groups may be derived from any of the mercaptan compounds heretofore employed in the polyphosphazene polymer art. Thus, for example, the mercaptan compounds described in U.S. Pat. No. 3,974,242 to Lanier et al, incorporated herein by reference, may be utilized. Representative of suitable mercaptan compounds as described in the aforementioned patent are methyl mercaptan and its homologs ethyl, propyl, butyl, aryl and hexyl mercaptans, thiophenol, thionaphthols, benzyl mercaptan, cyclohexyl mercaptan and the like.

The preferred substituent groups represented by X' for use in the copolymers of the invention are alkoxy groups, especially fluoroalkoxy groups, and aryloxy groups, especially chlorophenoxy groups.

As mentioned heretofore, the copolymers of the invention are preferably prepared by reacting the poly(dichlorophosphazene) polymer, with a mixture of the sulfone compound and other desired reactants (e.g. aliphatic or aromatic alcohol, amino compound, mercaptan compound etc.) in the presence of a tertiary amine.

IV. THE TERTIARY AMINE

The use of the teritary amine in preparing the copolymers of the invention minimizes undesirable side reactions and at the same time acts as an effective acid scavenger.

Tertiary amines which may be employed in preparing the copolymers of the invention are those represented by the general structure:

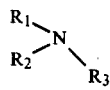

wherein $R_1$, $R_2$, and $R_3$ may each be alkyl containing from 1 to 8 carbon atoms. Thus, for example, the tertiary amine may be a trialkyl amine such as trimethylamine, triethylamine, tri-isopropylamine, tri-n-propylamine, tri-isobutylamine, tri-n-butylamine, and the like. In addition, tertiary amines such as pyridine, N,N,N',N'-tetramethylethylene diamine (TMEDA), dipipyridyl ethane, 1,4 diaza bicyclo (2.2.2) octane (DABCO), N-methyl pyrolle and N-methyl morpholine can also be utilized.

The preferred tertiary amines for use in preparing the copolymers of the invention are triethylamine, N,N,N',N'-tetramethylethylene diamine and pyridine.

The specific reaction conditions and proportion of ingredients employed in preparing these copolymers can vary somewhat depending on factors such as the reactivity of the specific substituent or substituent mixture utilized, the particular tertiary amine employed, and the degree of substitution desired in the finished polymer. In general, reaction temperatures may range from about 25° C. to about 200° C. and times may range from 3 hours up to 7 days; lower temperatures necessitating longer reaction times and higher temperatures allowing shorter reaction times. These conditions are, of course, utilized in order to obtain the most complete reaction possible, i.e., in order to insure substantially complete conversion of the chlorine atoms in the polymer to the corresponding ester of the substituent mixture.

The above reaction is ordinarily carried out in the presence of a solvent. The solvent or solvent mixture employed in the reaction should be a solvent for the poly(dichlorophosphazene) polymer, the substituent mixture and the tertiary amine.

In addition, the materials in the reaction zone should be reasonably free of water, most preferably containing 0.01 percent by weight of water or less. The prevention of water in the reaction system is necessary in order to inhibit the reaction of the available chlorine atoms in the chloropolymer therewith. Examples of suitable solvents which may be employed include diglyme, triglyme, tetraglyme, toluene, xylene, cyclohexane, chloroform, dioxane, dioxalene, methylene chloride, tetrachloroethane, and tetrahydrofuran. The amount of solvent or solvent mixture employed is not critical and any amount sufficient to solubilize the reaction mixture materials can be employed.

In general, the amount of the substituent mixture employed in the process should be at least molecularly equivalent to the number of available chlorine atoms in the polymer mixture. However, if desired, an excess of such compounds may be employed in order to insure substantially complete reaction of all the available chlorine atoms.

The following examples are submitted for the purpose of further illustrating the nature of the present invention and is not intended as a limitation on the scope thereof. Parts and percentages referred to in the examples are by weight unless otherwise indicated.

EXAMPLE 1

Preparation of [(CH$_3$SO$_2$CH$_2$)(CF$_3$CH$_2$O)PN] Copolymer

To a 10 oz. bottle was added 100 cc of dry tetrahydrofuran (hereinafter THF), 12.3 cc (88 millimoles) of dry triethylamine, 4.14 grams (44 millimoles) of dimethylsulfone, 3.2 cc (44 millimoles) of trifluoroethanol and 30.5 grams of a 15.3 percent solids solution of poly(dichlorophosphazene), having a degree of polymerization of about 2600, in THF. The reaction mixture was heated at 120° C. for 20 hours at which time triethylamine hydrochloride precipitated from solution. The polymer solution was subjected to Infrared Spectroscopy (hereinafter IR) and showed virtually no P-Cl band at 600 cm$^{-1}$ indicating excellent conversion. Coagulation in hexane produced 5.1 grams of a tan powder.

A sample of the polymer powder when pressed at 150° C. under pressure of 120 psi resulted in the production of a hard film.

A sample of the polymer was analyzed and showed the following:

|  | %C | %H | %N | %P | %Cl | %S |
|---|---|---|---|---|---|---|
| Actual | 19.20 | 2.04 | 7.64 | 14.88 | 1.29 | 1.67 |
| *Calculated | 19.19 | 2.40 | 7.28 | 15.02 | 1.30 | 1.64 |

*Based upon 4.82% triethylamine hydrochloride, 10.9% hydrolyzed chloropolymer, 78.17% trifluoroethanol derivative, and 5.1% dimethyl sulfone derivative.

EXAMPLE 2

Preparation of [(CH$_3$SO$_2$CH$_2$)(p-ClC$_6$H$_5$O)PN] Copolymer

To a 10 oz. bottle was added 100 cc of THF, 4.14 grams (44 millimoles) of dimethyl sulfone (CH$_3$SO$_2$CH$_3$), 4.43 cc (44 millimoles) of p-chlorophenol, 12.3 cc (88 millimoles) of triethylamine and 35.3 grams (39.6 millimoles) of a 13.0 percent solids solution of the poly(dichlorophosphazene) of Example 1 in THF. The reaction mixture was heated at 120° C. for 20 hours at which time triethylamine hydrochloride precipitated from solution. The polymer solution was subjected to IR and showed no P-Cl band at 600 cm$^{-1}$ indicating excellent conversion. New bands were observed at 566, 539, 498 and 467 cm$^{-1}$. Coagulation in methanol produced 7.23 grams of a white rubbery polymer product.

EXAMPLE 3

Preparation of

Copolymer

To a 10 oz. bottle was added 100 cc of THF, 5.21 grams (44 millimoles) of 2,5-dihydro-thiophene 1,1-dioxide (3-sulfolene or butadiene sulfone), 3.2 cc (44 millimoles) of trifluoroethanol, 12.3 cc (88 millimoles) of triethylamine, and 42.3 grams (39.9 millimoles) of a 10.93 percent solids solution of poly(dichlorophosphazene) in THF. The reaction mixture was heated at 80° C. for 68 hours. The polymer solution was subjected to IR and showed new bands at 587, 562 and 538 cm$^{-1}$. The 587 cm$^{-1}$ band interfered to some degree with the precise determination of residual P-Cl band at 600 cm$^{-1}$ but no evidence of this absorption was evident. Coagulation in methanol resulted in the production of 5.83 grams of a black powder.

We claim:

1. A polyphosphazene copolymer containing units represented by the formulas:

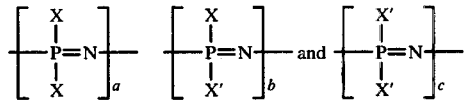

wherein X is a sulfone radical selected from the group consisting of —CR$_1$R$_2$—SO$_2$—R and

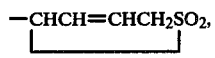

in which R is alkyl containing from 1 to 12 carbon atoms, cycloalkyl containing from 3 to 12 carbon atoms or aryl and R$_1$ and R$_2$ are individually selected from the group consisting of hydrogen, alkyl radicals containing from 1 to 11 carbon atoms, cycloalkyl radicals containing from 3 to 11 carbon atoms and aryl radicals; wherein X' is an organic radical selected from the group consisting of substituted or unsubstituted alkoxy, aryloxy, amino and mercapto groups and wherein 20≦(a+b+c)≦50,000 per polymer.

2. The copolymer of claim 1 wherein X is CH$_3$SO$_2$CH$_2$—.

3. The copolymer of claim 1 wherein X is CH$_3$SO$_2$CH$_2$— and X' is CF$_3$CH$_2$O—.

4. The copolymer of claim 1 wherein X is CH$_3$SO$_2$CH$_2$— and X' is p-ClC$_6$H$_5$O—.

5. The copolymer of claim 1 wherein X is

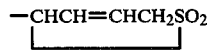

and X' is CF$_3$CH$_2$O—.

6. A method of preparing polyphosphazene copolymers containing units represented by the formulas:

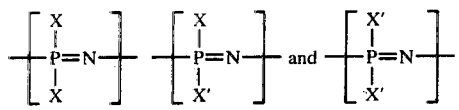

wherein X is a sulfone radical selected from the group consisting of —CR$_1$R$_2$—SO$_2$—R and

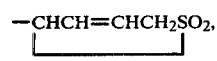

in which R is alkyl containing from 1 to 12 carbon atoms, cycloalkyl containing from 3 to 12 carbon atoms or aryl and R$_1$ and R$_2$ are individually selected from the group consisting of hydrogen, alkyl radicals containing from 1 to 11 carbon atoms, cycloalkyl radicals containing from 3 to 11 carbon atoms and aryl radicals and wherein X' is an organic radical selected from the group consisting of substituted or unsubstituted alkoxy, aryloxy, amino and mercapto groups; said method comprising reacting a poly(dichlorophosphazene) polymer having the formula —(NPCl$_2$)$_n$—, in which n is from 20 to 50,000, with a mixture consisting of a sulfone compound and an aliphatic alcohol, aromatic alcohol, amine or mercaptan or mixture thereof, in the presence of a tertiary amine.

7. The method of claim 6 wherein said mixture is a mixture of a sulfone compound and an aliphatic alcohol.

8. The method of claim 7 wherein said sulfone compound is dimethyl sulfone and said aliphatic alcohol is trifluoroethanol.

9. The method of claim 7 wherein said sulfone compound is 2,5-dihydrothiophene 1,1-dioxide and said aliphatic alcohol is trifluoroethanol.

10. The method of claim 6 wherein said mixture is a mixture of a sulfone compound and an aromatic alcohol.

11. The method of claim 10 wherein said sulfone compound is dimethyl sulfone and said aromatic alcohol is p-chlorophenol.

12. The method of claim 6 wherein said tertiary amine is triethylamine.

* * * * *

UNITED STATES PATENT AND TRADEMARK OFFICE
CERTIFICATE OF CORRECTION

PATENT NO. : 4,182,837
DATED : January 8, 1980
INVENTOR(S) : William L. Hergenrother and Adel F. Halasa It is certified that error appears in the above-identified patent and that said Letters Patent are hereby corrected as shown below:

Column 3, line 11

"$CH_2=CHCH_2SO_2$" should read

-- $CH_2CH=CHCH_2SO_2$ --

Column 4, line 1

"ios" should read -- iso --

Signed and Sealed this

Eighteenth Day of November 1980

[SEAL]

*Attest:*

*Attesting Officer*

SIDNEY A. DIAMOND

*Commissioner of Patents and Trademarks*